(12) United States Patent
Downey et al.

(10) Patent No.: US 6,844,524 B2
(45) Date of Patent: Jan. 18, 2005

(54) HEATED CYCLE GRIP WITH TEMPERATURE CONTROL

(76) Inventors: Philip L. Downey, 244 Mercury Cir., Pomona, CA (US) 91768; John R. Downey, 244 Mercury Cir., Pomona, CA (US) 91768; Jonathan B. Downey, 244 Mercury Cir., Pomona, CA (US) 91768

( * ) Notice: Subject to any disclaimer, the term of this patent is extended or adjusted under 35 U.S.C. 154(b) by 0 days.

(21) Appl. No.: 10/194,209

(22) Filed: Jul. 12, 2002

(65) Prior Publication Data
US 2004/0007567 A1 Jan. 15, 2004

(51) Int. Cl.$^7$ .............................. H05B 1/02; B60L 1/02
(52) U.S. Cl. ...................... 219/204; 219/494; 219/504
(58) Field of Search .................................. 219/204, 494, 219/544, 540, 530, 202, 504; 74/551.9

(56) References Cited

U.S. PATENT DOCUMENTS

| | | | |
|---|---|---|---|
| 3,191,005 A | * | 6/1965 | Cox ........................... 219/544 |
| 4,471,209 A | | 9/1984 | Hollander |
| 4,631,976 A | | 12/1986 | Noda et al. |
| 4,838,113 A | | 6/1989 | Matsushima et al. |
| 4,937,429 A | * | 6/1990 | Hollander ................... 219/204 |
| 5,757,165 A | | 5/1998 | Minks |
| 6,114,668 A | | 9/2000 | Ogata et al. |
| 6,222,162 B1 | * | 4/2001 | Keane ......................... 219/481 |
| 6,268,588 B1 | | 7/2001 | Hazebrouck et al. |
| 2003/0111453 A1 | * | 6/2003 | Haag et al. .................. 219/204 |

FOREIGN PATENT DOCUMENTS

| | | | | |
|---|---|---|---|---|
| DE | 3036641 | | 5/1982 | |
| DE | 29705656 | * | 5/1997 | |
| DE | 29919346 | * | 1/2000 | |
| DE | 10048181 | * | 4/2002 | |
| FR | 2520320 | * | 7/1983 | |
| FR | 2800701 | * | 5/2001 | |
| GB | 571069 | * | 8/1945 | ................. 219/204 |
| IT | 530836 | * | 7/1955 | ................. 219/204 |

* cited by examiner

Primary Examiner—John A. Jeffery
(74) Attorney, Agent, or Firm—Charles H. Thomas

(57) ABSTRACT

An electrically powered resistance heating handgrip includes a control circuit located within a hollow core that fits coaxially within the open end of a handlebar of a motorcycle or snowmobile. The control circuit is mounted on a thin, narrow, elongated printed circuit board and includes a microprocessor that is programmed to contain a lookup table of temperatures. A thermistor provides feedback signals to the microprocessor which compares temperature sensor feedback signals to a target temperature. The target temperature is established by a dial. The dial operates the wiper of a variable potentiometer to establish the target temperature. Heat is uniformly distributed by wrapping the heating element wire thereof about a thermally conductive sheet of aluminum, and encasing the wire within a temperature resistant dielectric sheathing.

16 Claims, 8 Drawing Sheets

HEATED CYCLE GRIP WITH TEMPERATURE CONTROL

BACKGROUND OF THE INVENTION

1. Field of the Invention

The present invention relates to a heating element control circuit and a heated handgrip of the type utilized on motorcycles, ski mobiles, and other vehicles employing handlebars with handgrips on them.

2. Description of the Prior Art

Heated handgrips have been utilized for many years on motorcycles, ski mobiles, and other vehicles, particularly those in which a user's hands are exposed to the ambient atmosphere when operating the vehicle. A conventional heated handgrip is normally powered by an electrical current passing through one or more electrical resistance heating elements. The passage of electrical current through high resistance electrical wires generates considerable heat. The electrical heating elements of a handgrip employed, for example, on a motorcycle, are normally embedded within a nonconductive material of which the grip is formed, for example rubber or plastic. Many conventional electrical, heated grips are constructed of rubber over nylon.

One recurrent problem that has existed with conventional grips is that they are damaged by improper or inattentive use. For example, a motorcycle rider is typically provided with some type of manual control to turn the heating elements of the motorcycle handgrips off and on, and even to adjust the temperature. If the rider is traveling at a high speed through frigid air, the controls for the grips will normally be adjusted to provide a great deal of heat. On the other hand, if the rider is traveling at slower speeds in heavier traffic and the ambient air temperature is not all that cold, only a small amount of electrical current to the resistance heating elements of the grips is appropriate.

Heated grips are often damaged due to overheating when the heating elements are left at a high heating level when they should be turned off. For example, a motorcycle rider may adjust the temperature of the grips to provide a considerable amount of heat when riding at high speed through cold air but may forget to turn electrical current to the heating elements down or off when the rider arrives at a destination and parks the motorcycle. The nylon materials of which handgrips are often formed typically melt at a temperature of between about three hundred fifty degrees and about four hundred fifty degrees Fahrenheit, depending upon the particular type of nylon. If the heating elements of heated automotive vehicle handgrips are left on high for a prolonged period of time in relatively warm ambient air, the material of which the grips is constructed will become distorted, melt, or otherwise become degraded. This can lead to a very dangerous situation in which the throttle control in the grip will lock up due to distortion. Also, since the cost of heated cycle handgrips is not inconsequential, forgetfulness in maintaining a proper temperature of the heating elements can be quite costly.

Temperature control systems do exist for heated vehicle handgrips. However, conventional heated handgrips for motorcycles and snowmobiles do not maintain a particular temperature. Rather the user selects a desired electrical current level for heating the grip and electrical current is fed to the electrical resistance heating element constantly at a current magnitude proportional to the setting. However, conventional systems do not include control circuitry for maintaining a constant temperature, but rather only a specified level of electrical current. Consequently, the actual temperature of the article will vary significantly, unless manually adjusted by the user, since the same electrical current is supplied to the electrical resistance heating element irrespective of whether the vehicle is moving at a high rate of speed in cold weather, or whether the vehicle is stopped. In conventional systems for heated motorcycle and snowmobile handgrips the user must manually alter temperature settings in order to increase or decrease electrical current to the handgrip. Moreover, conventional systems involve a continuous supply of electrical current to the heating element. If the ambient temperature about the vehicle handgrip increases, overheating of the grip can easily occur unless the user is extremely diligent in monitoring the temperature setting.

An electrical heating control circuit according to the invention can be located anywhere on the vehicle. However, the system of the invention is preferably provided with a hollow, handgrip core located within the hollow vehicle handlebar and the electrical heating control circuit is located within that core. This represents a further improvement over conventional electrical resistance heat control systems which are often rather bulky and involve extended runs of wire to the grips from control circuits located on the frames of motorcycles or other vehicles. The lengthy run of wires in conventional heating current selector systems reduces the ability of a conventional heating adjustment circuit to provide an appropriate amount of heat in changing ambient conditions. Therefore, conventional vehicle handgrip temperature setting controls have proven unsatisfactory.

SUMMARY OF THE INVENTION

A principal object of the present invention is to provide a control circuit for an electrical resistance heating element of a battery-powered article, and in particular for a heated vehicle handgrip. The control circuitry of the invention may be utilized in a wide variety of different article to be heated, such as boots, gloves, vehicle seats, steering wheel covers, jackets, hats, and other portable or mobile articles having an electrical resistance heating element powered by a storage battery. In the embodiment of the invention illustrated and described herein the control circuit is applied to a handgrip for a motorcycle or snowmobile having an electrical resistance heating element embedded therein.

The control circuit may be located anywhere on the vehicle. However, it is particularly advantageous for the electrical resistance control circuit to be located within the grip itself. That is, unlike conventional vehicle handgrip heating systems, the electrical resistance heating control circuit of the vehicle handgrips of the present invention is preferably mounted within one of the hollow handlebars at the open, outboard handlebar end thereof. This is achieved by providing at least one of the heated grips with an inner, tubular core that is positioned within the open end of the handlebar, in addition to the typical, socket-shaped handgrip structure that is normally disposed externally on the open end of the handlebar. This internal core contains the heating control circuit.

The location of the control circuit within the interior structure of the handlebar serves several purposes. First of all, due to its location within the handlebar, the control circuit is well protected from damage. In conventional systems in which an electrical resistance heating current selector is mounted upon the chassis of the vehicle, there is a great likelihood of damage to the relatively delicate electrical components in the heat control circuit, since the vehicle frame is often subjected to rough treatment by the rider and by other objects in the vicinity, such as other motorcycles. Also, when heat selector circuits are mounted on the exterior of a vehicle, such as a motorcycle, they are exposed to a great deal of dirt, grease, road dust, exhaust smoke, and other elements that are quite likely to damage the electrical circuitry. By locating the control circuit within the rigid, confining structure of the handlebar, it is well protected from damage.

A further advantage of locating the control circuit within the confining structure of the handlebar, is that the control circuit can thereby be positioned physically very close to the temperature sensor and also one of the heating elements. This minimizes the amount of wiring required to extend from the control circuit to the temperature sensor and the heating elements, thereby minimizing the likelihood of distortion of signals from the temperature sensor due to passage of electrical current through exposed contact terminals and long lengths of electrical wire exposed to ambient temperature conditions.

A related object of the invention is that, due to the very considerable protection afforded to the control circuit by positioning it within the handlebar, very accurate and reliable, but delicate, electrical components may be employed in the control circuit. Specifically, the control circuit may be equipped with a microprocessor that would simply be too vulnerable to damage unless housed within a heavy, bulky casing, if located on the frame of the vehicle. By utilizing a microprocessor the electrical control circuit can be provided with the flexibility to detect abnormal electrical circuit conditions likely to lead to damage to the handgrip. More specifically, if there is a failure of one of the circuit components that results in a short circuit to either the left-hand or right-hand electrical resistance heating element in a pair of cycle handgrips, current flow to one or both of the electrical resistance heating elements will rise to an abnormally high level above a predetermined maximum temperature. The microprocessor senses this condition and shuts down current flow to the resistance heating elements to prevent damage to the handgrips.

Another very important object of the invention is to provide an electrical resistance heating control circuit that is equipped with actual temperature feedback inputs. The control circuit is thereby able to respond to changes in ambient conditions to increase or decrease the flow of electrical current to the heating element. In this connection a temperature sensor is provided near the resistance heating element. For example, when the control circuit of the invention is employed with a heated cycle grip, the temperature sensor may be located within the structure of the grip itself. As a consequence, the temperature sensor is subjected to the same changes in ambient temperature conditions as the electrical resistance heating element to be controlled. The temperature sensor thereby provides a feedback signal to the programmed control circuit, and the programmed control circuit responds to this feedback signal by supplying or interrupting electrical current to the electrical resistance heating element.

A further object of the invention is to provide an electrical resistance heating element with a control circuit that responds promptly to rapidly increase heat when the temperature sensor is below a selected target temperature, and to shut off all current to the electrical resistance heating element immediately when the temperature of the heating element arrives at its target temperature.

The handgrip of the invention has other important features, as well as the self-contained, microprocessor-based control circuit. The unique construction of the electrical resistance heating element in each grip provides a more uniform distribution of heat along the length of the grip as contrasted with prior heated cycle handgrips.

Like conventional heated grips, the electrical resistance heating element is formed of a length of nickel-chromium wire wound in a spiral fashion along the length of the grip externally about an inner, underlying throttle sleeve. An outer, external sleeve formed of rubber or thermoplastic rubber is disposed about the electrical resistance heating wire and the inner throttle sleeve located therewithin.

Conventional cycle handgrips of this type are subject to considerable damage due to inattention on the part of the rider. For example, if power to the heating elements in conventional heated handgrips is not turned off when the vehicle is stopped and left for a period of time, the continued supply of electrical current to the electrical resistance heating element will severely damage the grip due to overheating. In a conventional grip of this type heat from the electrical resistance heating wire melts or distorts both the inner, underlying throttle sleeve, which is typically fabricated of nylon, and also the overlying, external rubber sleeve. If the throttle sleeve becomes distorted due to overheating, it will not properly rotate on the vehicle handlebar. This can lead to disastrous consequences when a rider must accelerate or decelerate rapidly to avoid traffic.

In conventional cycle handgrips the spiral pattern of the electrical resistance heating wire may readily be seen on the external, outer sleeve when overheating occurs. Also, unless the outer sleeve is made inordinately thick, the hand of the rider will be burned when the rider returns to the cycle and grips the outer sleeve after having inadvertently left power on to the resistance heating elements when the vehicle was parked. Also, the electrical resistance heating wire will sometimes melt the inner, nylon sleeve completely through and create a short circuit by contact with the steel cycle handlebar located beneath the inner throttle sleeve.

The cycle handgrip sleeve of the present invention avoids these problems due to its unique construction. Specifically, a sheet of thermally conductive metal foil, preferably aluminum foil, is wrapped about the inner handgrip throttle sleeve and the electrical resistance heating wire is wound on top of this metal foil. Also, the metal electrical resistance heating wire is covered with a tubular dielectric sheath of material having a relatively high melting point. The temperature resistant insulation on the resistance heating wire should resist thermal degradation up to a temperature greater than four hundred fifty degrees Fahrenheit, and preferably at least five hundred degrees Fahrenheit.

The electrical resistance heating wire used in the present invention is preferably sheathed with Teflon®, which melts at approximately five hundred degrees Fahrenheit. As a consequence, the metal foil sheet dissipates heat from the electrical resistance heating wire much more uniformly along the length of the cycle handgrip, as contrasted with conventional grips. The use of this metal foil layer in combination with the dielectric sheathing on the electrical resistance heating wire largely eliminates the occurrence of "hot spots" in the grip along the spiral path of the electrical resistance heating wire. The reduction of heat concentration and spreading of the heat uniformly along the length of the grip prevents the electrical resistance heating wire from melting or distorting the inner handgrip sleeve.

Preferably also, a thermoplastic layer is disposed about the sheathed electrical resistance heating wire and is adhesively secured to the metal foil and thermally bonded to the outer sleeve forming the handgrip casing. This thermoplastic layer is chosen so as to thermally bond to the outer sleeve and is disposed on top of the electrical resistance heating wire.

Furthermore, the thermoplastic layer located about the sheathed electrical resistance heating wire ensures that the entire structure of the cycle handgrip is bonded together. The thermoplastic layer preferably has an adhesive on its inside surface to adhesively bond it to the aluminum foil and the Teflon®-coated heating wire. Moreover, the thermoplastic layer on top of the sheathed electrical resistance heating wire forms a thermal bond with the outer casing sleeve so that the layers of the handgrip casing will not separate from each other. The thermal layer on the sheathed heating wire and the underlying aluminum foil also protects the outer rubber or thermoplastic rubber sleeve from being burned. Moreover, if formed of the proper material, such as polypropylene, the thermoplastic layer will actually bond to the outer, rubber or thermoplastic rubber sleeve. If applied in the form of a tape overwrapped about the sheathed electrical resistance heating wire, the polypropylene layer will thermally bond to the rubber or thermoplastic rubber outer sleeve when the outer sleeve is injection molded onto the underlying layers of the grip casing.

Because the outer, external rubber sleeve is protected from heat degradation that would otherwise result from the flow of electrical current through the electrical resistance heating wire, the outer diameter of the outer, external sleeve can be reduced. This is possible since less material is required to absorb the heat generated by the electrical resistance heating wire. This reduction in the required quantity of material reduces the cost of the grip.

In one broad aspect the present invention may be considered to be an improvement in a vehicle handgrip employing an electrical resistance heating element embedded in a casing disposed coaxially about the open end of a hollow vehicle handlebar of a vehicle that includes an electrical storage battery. The improvement of the invention is comprised of a programmed electrical heating control circuit with electrical leads to the heating element and adjusted to maintain the heating element at a selected target temperature, and a power input to the control circuit for operation from the vehicle battery.

Preferably, the vehicle handgrip is located within the hollow vehicle handlebar and is mounted on a printed circuit board which is located within the hollow handgrip core. Preferably also, the vehicle handgrip is further comprised of an electrical temperature sensor, which may be a thermistor, located in the casing and externally of the handlebar. Electrical connectors are coupled from the thermistor to the control circuit. The thermistor monitors temperature of the casing and provides feedback signals to the control circuit. The control circuit is adjusted by these feedback signals to maintain the casing at a target temperature and responds to the feedback signals from the temperature sensor to alternatively conduct and interrupt electrical power from the vehicle battery to the electrical resistance heating element.

Preferably also the handgrip is further comprised of an adjustable potentiometer coupled to the control circuit and having a wiper controlled by a dial mounted on the casing. The dial may be in the form of an annular ring rotated relative to the casing, but preferably is a disc-shaped structure located proximate the open end of the hollow cycle handlebar.

The control circuit preferably includes a microprocessor located within the handgrip core which receives the feedback signals from the thermistor and which is programmed to contain a lookup table to correlate the feedback signals to temperature readings and to conduct and interrupt power according to whether the temperature readings meet or exceed the target temperature.

Preferably also the microprocessor is further programmed to interrupt power to the electrical resistance heating element whenever the feedback signals indicate a temperature that exceeds a predetermined maximum temperature. The microprocessor thereby protects the operating electrical components and the handgrip from damage that might otherwise result from short circuits.

In another broad aspect the invention may be considered to be a heated vehicle handgrip for mounting on an open end of a hollow handlebar comprising a tubular grip casing, an electrical resistance heating control circuit, connections, and electrical power leads. The handgrip casing has one end which defines an open mouth and an opposite end that defines an annular casing butt with a central, axial opening therethrough. The casing is adapted for positioning externally on the handlebar and has an electrical resistance heating element and a temperature sensor embedded therewithin.

The electrical resistance heating control circuit is programmed to maintain the heating element at a selected target temperature selected from among a plurality of temperatures. The electrical resistance heating control circuit may be located anywhere on the vehicle. Electrical heating element connectors extend from the electrical resistance heating element at the casing butt to the control circuit. Electrical temperature sensor connectors also extend from the temperature sensor at the casing butt end to the control circuit. Electrical power leads are coupled to the electrical resistance heating control circuit to provide power thereto and to the electrical heating element.

Preferably, a hollow, electrically insulated core is mounted internally within the hollow handlebar of the vehicle and within the handgrip casing. The handgrip core has inboard and outboard ends and includes an annular and radially outwardly projecting flange at its outboard end. The core flange is longitudinally trapped between the open end of the handlebar and the annular casing butt.

The control circuit preferably includes a microprocessor and is mounted on a narrow printed circuit board that is located within the hollow core. The control circuit may be provided with an adjustably variable potentiometer that is secured relative to the casing. The variable potentiometer includes a wiper. A dial is mounted onto the grip casing and is movable in rotation relative thereto to manipulate the wiper of the potentiometer.

The heating control circuit of the invention has applications beyond electrically heated vehicle handgrips. In another broad aspect the invention may be considered to be a heating device for an article comprising: an electrical resistance heating element embedded in the article; a temperature sensor attached to the article; an electrical resistance heating control circuit coupled to the electrical resistance heating element and including a microprocessor that is programmed to maintain the electrical resistance heating element at a selected target temperature selected from among a plurality of temperatures; and an electrical storage battery coupled to the article and electrically connected to provide power to both the electrical resistence heating element and to the electrical resistence heating control circuit. For example, the same electrical resistence heating control circuit that is used to control the temperature of a vehicle handgrip may be utilized to control the temperature of electrical resistance heating elements in gloves, boots, jackets, vehicle seats, and vehicle steering wheel covers, as well as a wide variety of other types of articles. In such applications the electrical resistance heating element is embedded in the article in a manner suitable to provide heat to the article.

The microprocessor uses an internal lookup table to convert resistance readings to temperature. If the electrical resistance heating wire of the article to be heated is colder than the temperature selected by the user, the microprocessor turns on the transistor controlling the heating element and the article is heated. Once the heating element reaches the selected temperature, the microprocessor detects the selected temperature by means of the temperature sensor, which is preferably a thermistor. The microprocessor then turns off the heating element. When the article cools by a few degrees, the microprocessor detects the drop in temperature by means of the thermistor and the cycle is repeated. The microprocessor samples the thermistor temperature several times per second.

One of the programming features of the microprocessor is to shut down the heating elements if either an excessively high or excessively low condition is detected. This would occur if the thermistor or connector wires were to break or become shorted. This is basically a fail safe "OFF" feature to protect the article being heated in the very unlikely event that the thermistor or the connector wires fail.

One of the unique features of the heating system of the present invention is that the heating power is either on or off. This results in lower power consumption, as contrasted with a conventional rheostat which, when set to some intermediate temperature, is always drawing a current. The system of the present invention requires minimum power to heat and 99.5 percent of the power consumed goes toward heating the article. The system employs a temperature feedback by means of the thermistor which is located right next to the heating element in the article. The system also establishes a preset target temperature and that target temperature can be adjusted.

In still another aspect the invention may be considered to be a heated vehicle handgrip for mounting on an open end of a hollow vehicle handlebar. The handgrip of the invention is comprised of an inner handgrip sleeve, a sheet of thermally conductive metal foil, a sheathed electrically conductive heating wire, a dielectric sheath encasing the heating wire, a thermistor, a heating control circuit, and an outer sleeve. The inner handgrip sleeve is formed of an electrical insulating material for mounting coaxially upon the hollow vehicle handlebar end. The metal foil sheet is wrapped about the inner handgrip sleeve. The sheathed heating wire has opposing ends and is overwound about the metal foil sheet. Its diameter and length are selected to produce thirty-forty watts of thermal power. The dielectric sheath encases the heating wire. The dielectric sheath is resistant to thermal degradation up to a temperature greater than four hundred fifty degrees Fahrenheit, and preferably up to a temperature of five hundred degrees Fahrenheit. The thermistor is positioned proximate the sheathed heating wire. The heating control circuit is coupled to the thermistor and the outer sleeve is disposed coaxially about the sheathed heating wire and the thermistor. Preferably the metal foil sheet is formed of aluminum foil and the dielectric sheath is formed of Teflon®. The outer sleeve is preferably formed of rubber or a thermoplastic rubber composition and the handgrip is preferably further comprised of a thermoplastic layer disposed upon the sheathed electrical resistance heating wire and adhesively secured to the metal foil. The outer sleeve is preferably formed in a molten state upon the interior structure of the grip so that the thermoplastic layer becomes thermally bonded to the outer sleeve in the fabrication process.

A handgrip constructed in this manner has several unique features. Unlike conventional grips, a handgrip constructed as described in the immediately preceding paragraph will not degrade, even if the programmed temperature setting is left at a temperature level that is inordinately high for ambient conditions. The dielectric sheath encasing the heating wire serves not only to prevent the electrical resistance heating wire from short circuiting through the aluminum foil, but also is sufficiently thermally conductive and temperature resistant to uniformly heat the aluminum foil, which in turn uniformly heats the entire grip. The thermoplastic layer which is adhesively secured to the aluminum foil and thermally bonded to the outer sleeve ensures that the various layers forming the structure will not separate. A handgrip constructed in this manner may be left on in extremely hot weather for many hours without distortion or damage.

The invention may be described with greater clarity and particularity by reference to the accompanying drawings.

DESCRIPTION OF THE EMBODIMENT

Figure 1:
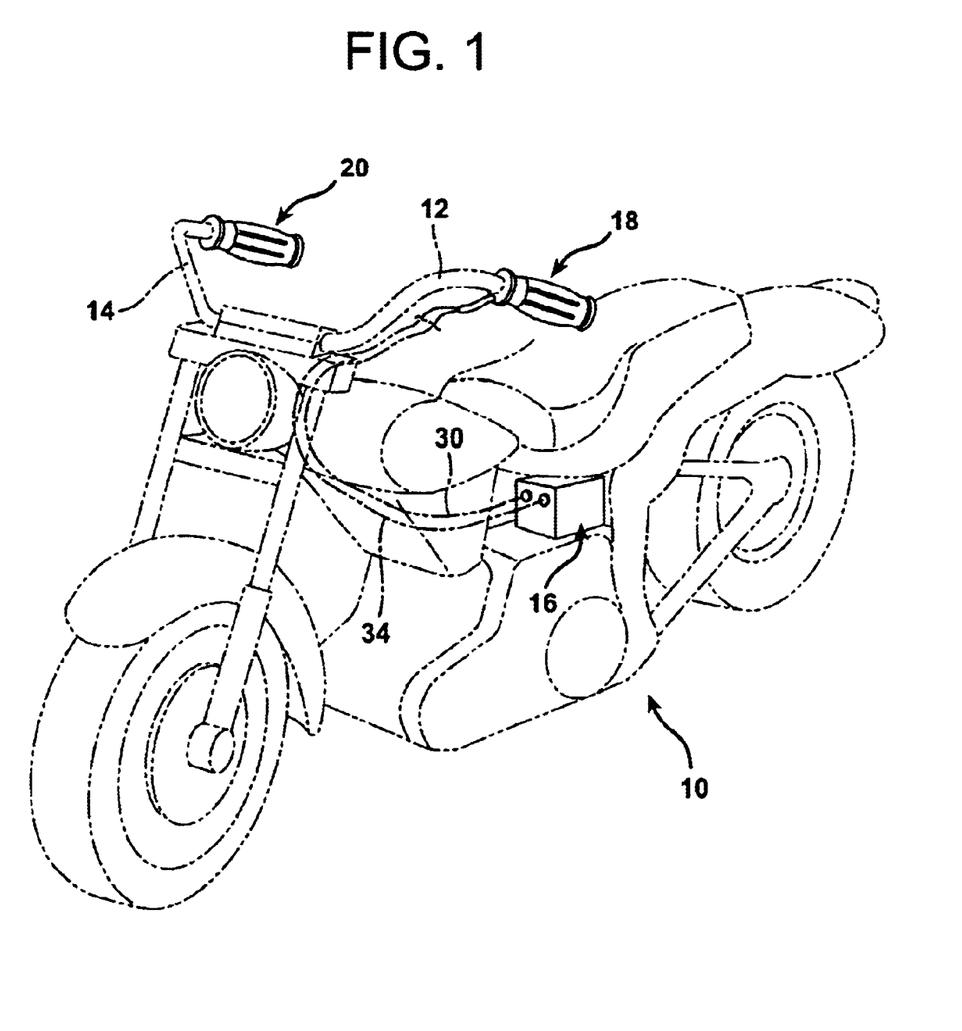
FIG. 1 is a perspective view of a motorcycle employing a set of heated handgrips according to the invention.

FIG. 1 illustrates a motorcycle generally at 10 equipped with hollow, stainless steel tubular handlebars and a set of heated vehicle handgrips. The left handlebar of the motorcycle 10 is indicated at 12, and the right handlebar is indicated at 14. Both of the handlebars 12 and 14 have open ends. The motorcycle 10 also includes a conventional lead-acid motorcycle electrical storage battery 16.

The motorcycle 10 is provided with a pair of heating cycle handgrips 18 and 20 constructed according to the present invention. The left motorcycle handgrip is indicated at 18, while the right motorcycle handgrip is shown at 20. The left motorcycle handgrip 18 is mounted coaxially upon the open end of the left handlebar 12, while the right handgrip 20 is rotatably mounted coaxially upon the open end of the right handlebar 14, since it is coupled to the conventional throttle control.

Figure 2:
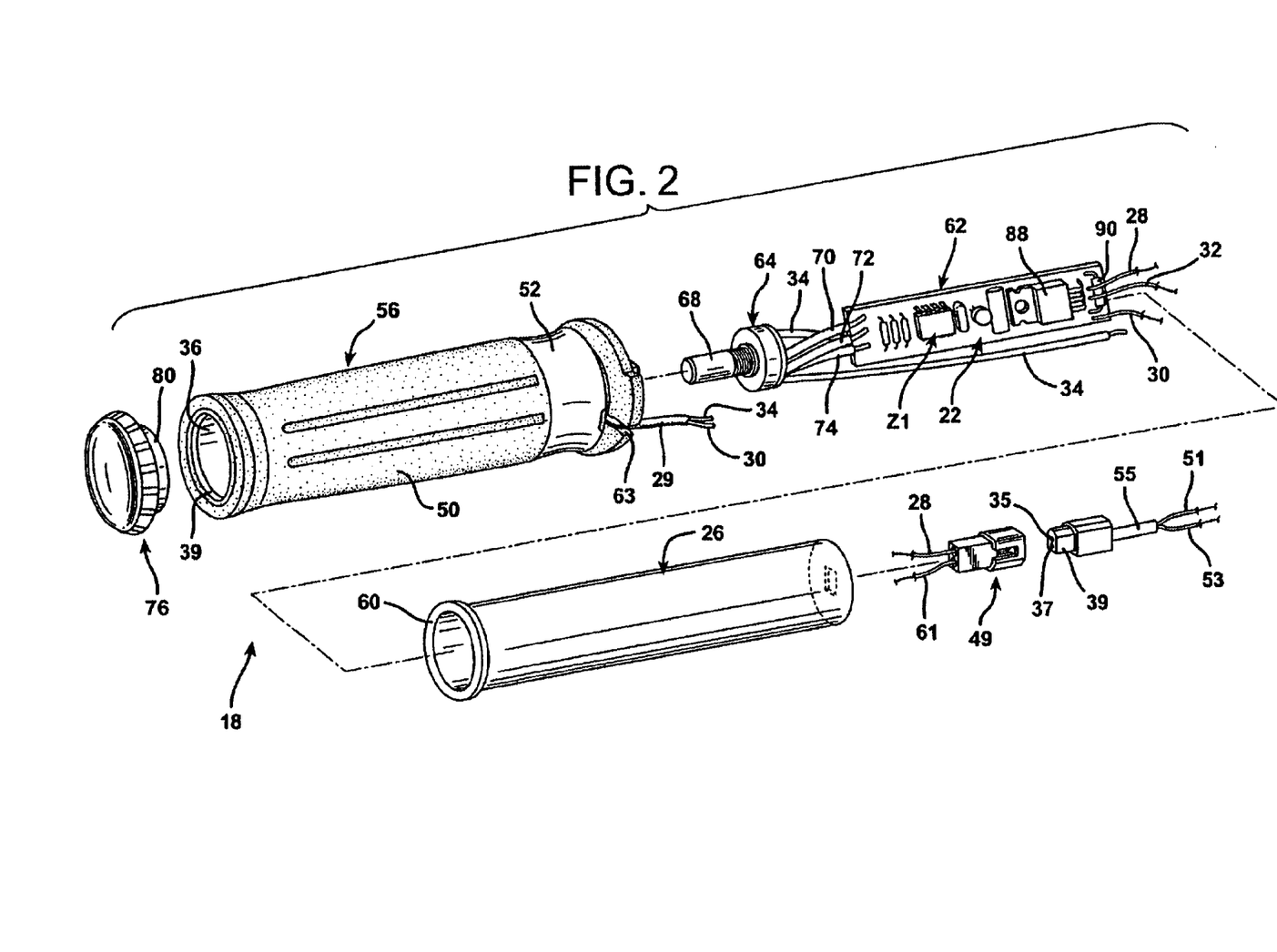
FIG. 2 is an exploded perspective view illustrating in isolation the grip prepared for mounting on the open end of the left motorcycle handlebar shown in FIG. 1.

The left handgrip 18 is shown in some detail in the exploded view of FIG. 2. The left handgrip 18 differs from the right handgrip 20 in that the left handgrip 18 contains a programmed electrical heating control circuit 22 that controls the provision and interruption of electrical current to the electrical resistance heating elements 24 of both the left handgrip 18 and the right handgrip 20. Therefore, the left handgrip 18 is equipped with a plastic, cylindrical, translucent handgrip core 26 that is located within the hollow motorcycle left handlebar 12. The programmed electrical heating control circuit 22 is provided with electrical leads 28 and 32 that are connected to the heating elements 24 in both the left handgrip 18 and the right handgrip 20, as illustrated in the schematic drawing of FIG. 8. The heating elements 24 of the left grip 18 and the right grip 20 are connected in series. The control circuit 22 is also provided with power input lines 30 and 34 for operation from the vehicle battery 16.

Figure 3:
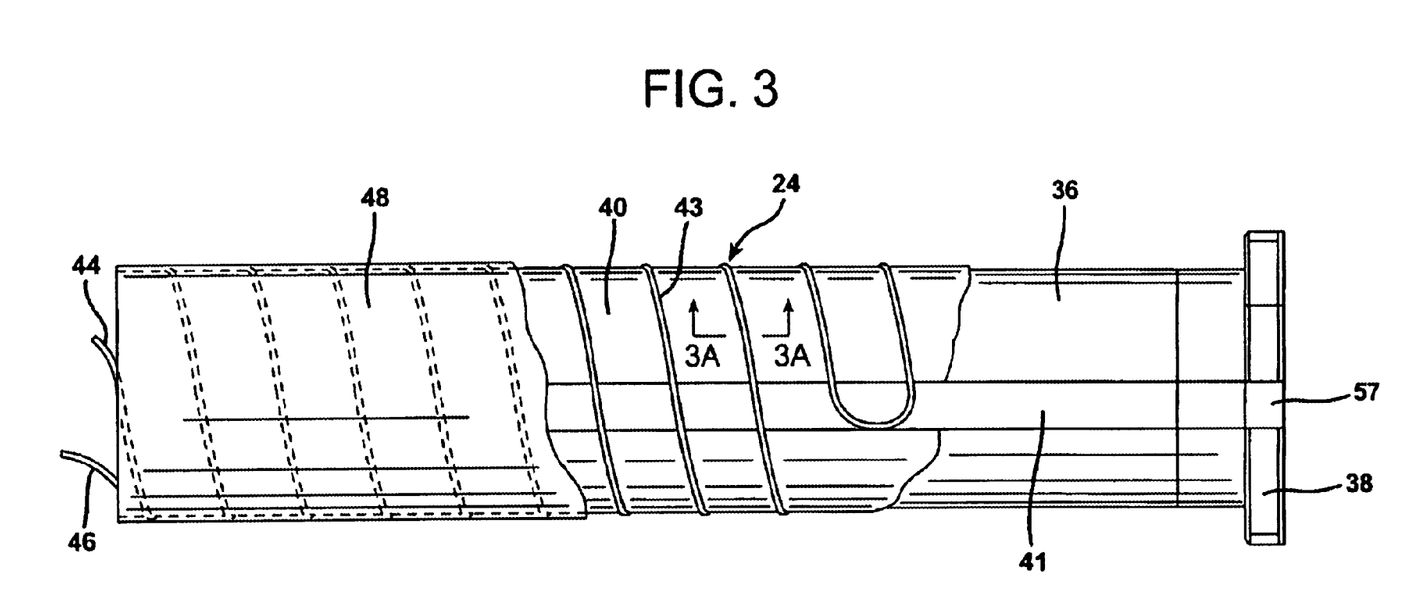
FIG. 3 is a side elevational view, partially broken away, showing the electrical resistance heating element of one of the handgrips illustrated in FIG. 1.
Figure 5:
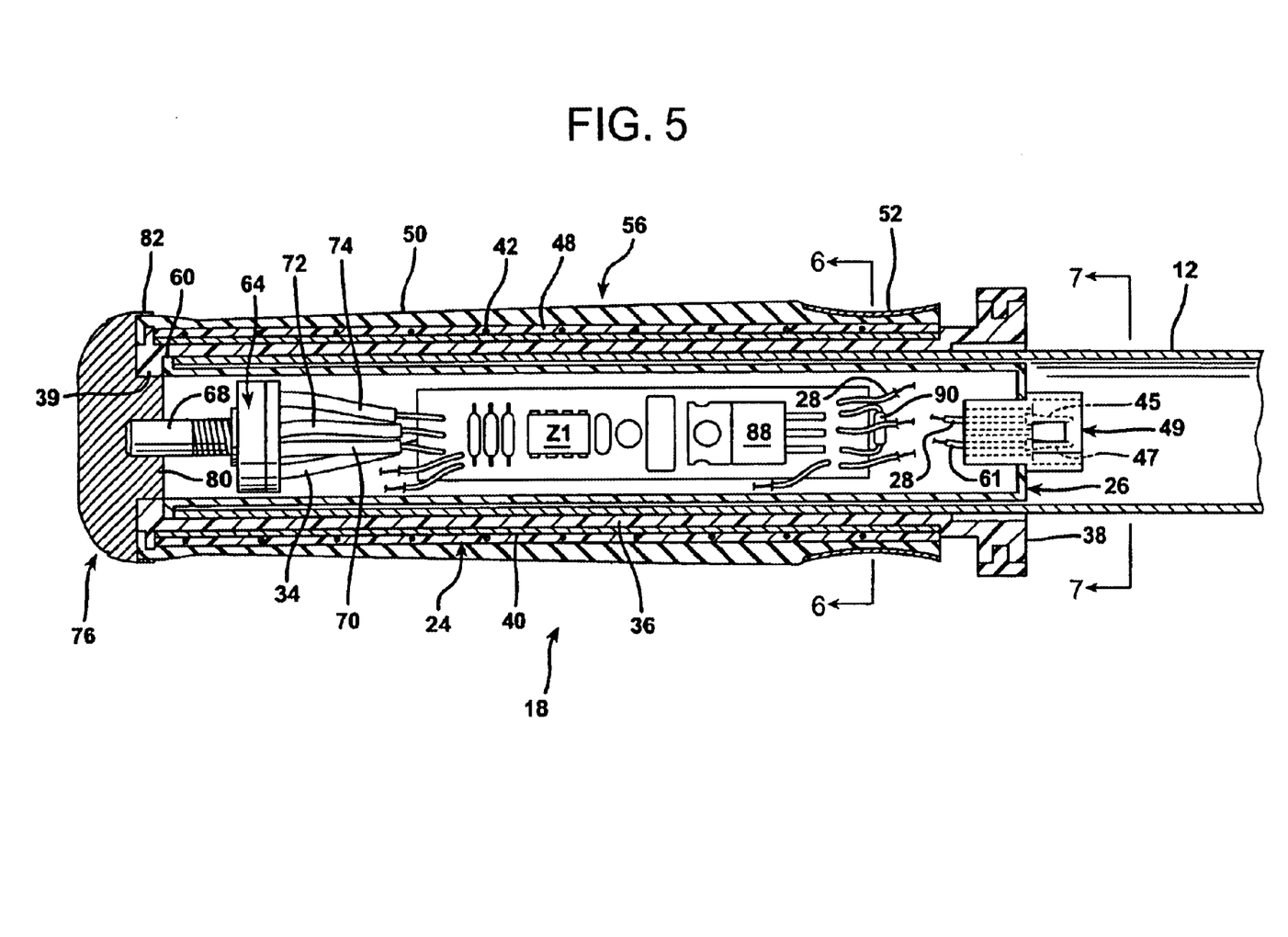
FIG. 5 is a side sectional elevational view taken along the lines 5—5 in FIG. 4.
Figure 6:
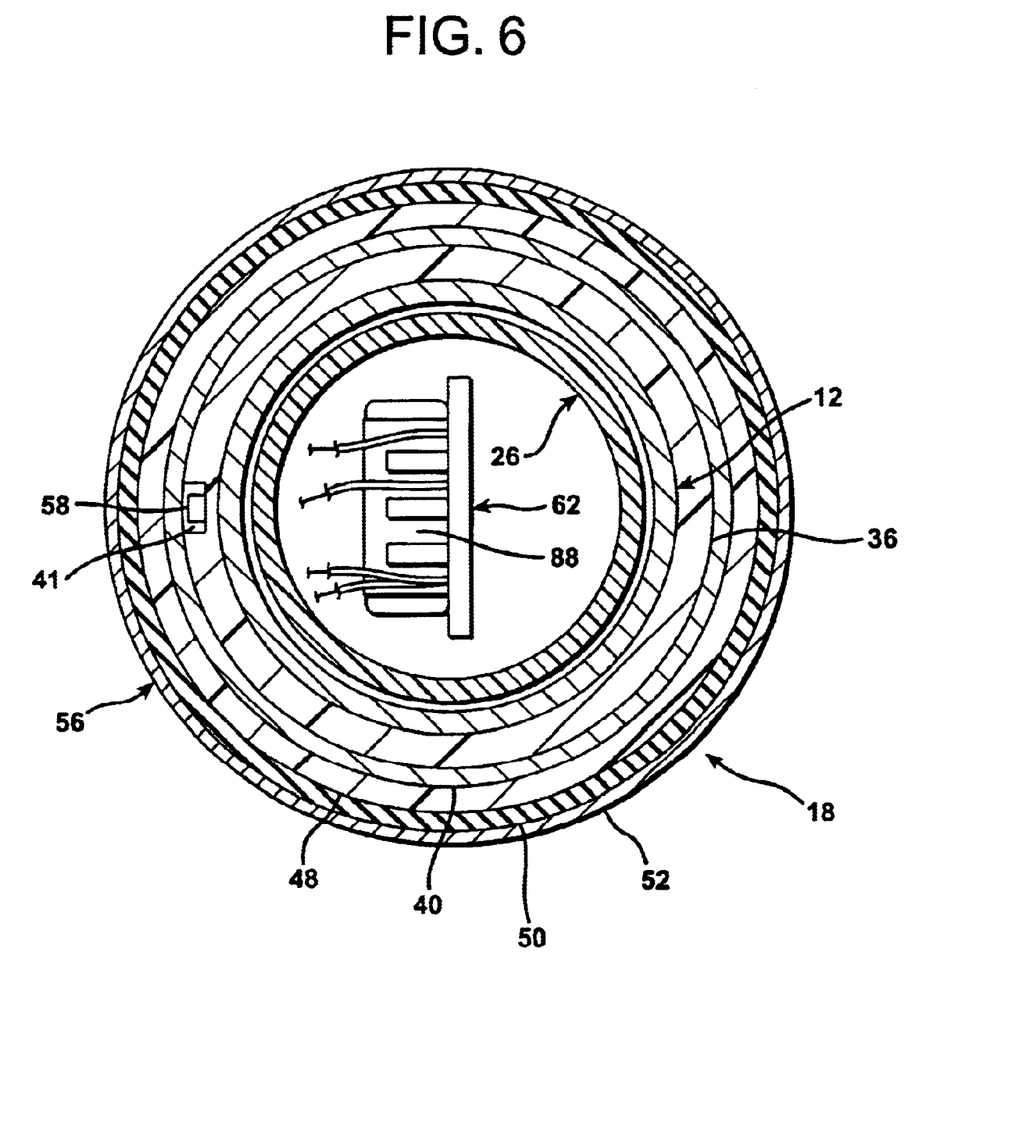
FIG. 6 is a transverse sectional view taken along the lines 6—6 in FIG. 5.

The electrical resistance heating elements 24 if the two handgrips 18 and 20 are identical in construction and are best illustrated in FIGS. 3, 5, and 6. As shown in those drawing figures, each of the handgrips 18 and 20 is provided with an inner handgrip sleeve 36, preferably formed of nylon, which is an electrically insulating material. Each sleeve 36 is preferably about one inch in outer diameter and about five inches in length and is mounted coaxially and externally upon one of the hollow, vehicle handlebar ends of the handlebars 12 and 14. The inner diameter of each inner handgrip sleeve 36 is just large enough to slide onto the exterior surface of the open end of the handlebars 12 and 14 in the manner indicated in FIG. 5. The sleeve 36 of the left handgrip 18 is immobilized on the handlebar 12 while the sleeve 36 of the right handgrip 20 is rotatably mounted on the right handlebar 14. Each of the sleeves 36 is provided with a radially outwardly projecting collar 38 at its inboard end and a radially inwardly projecting annular lip 39 at its outboard end. The term "outboard" as used herein, refers to a direction proceeding outwardly from the longitudinal, fore and aft alignment of the motorcycle 10 toward the open ends of the handlebars 12 and 14, while the term "inboard" is in an opposite direction.

A shallow channel 41 is defined in the outer surface of the inner sleeve 36 and extends longitudinally from the collar 38 all the way to the opposite end of the inner sleeve 36 at which the lip 39 is formed. The channel 41 serves as a duct for several electrical connecting wires of the heated vehicle handgrip system of the invention, as will hereinafter be described.

Figure 3A:
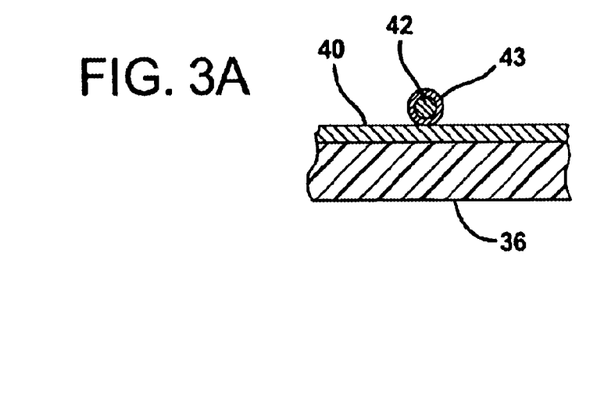
FIG. 3A is a sectional detail taken along the lines 3A—3A in FIG. 3.

As shown in FIG. 3, a sheet 40 of thermally conductive aluminum metal foil is wrapped about each inner handgrip sleeve 36. The longitudinal edges of the aluminum sheet 40 terminate at the edges of the channel 41, as illustrated in FIG. 3. A sheathed electrically conductive nickel-chromium electrical resistance heating wire 42 that is 0.015 inches in diameter is visible in FIG. 3A and is encased in a dielectric sheath 43 formed of Teflon® having an outer diameter of 0.030 inches. The Teflon® sheath 43 covers the electrical resistance heating wire 42 throughout its length, except at its opposing ends 44 and 46. The sheath of Teflon® tubing is resistant to thermal degradation up to a temperature of five hundred degrees Fahrenheit. The electrical resistance heating wire 42, together with its tubular, dielectric sheath 43, is formed into a loop and spirally wound about the metal foil sheet 40 so that both of the ends 44 and 46 of the wire 42 emanate from the Teflon® sheath 43 at the outboard end of the inner sleeve 36.

Figure 8:
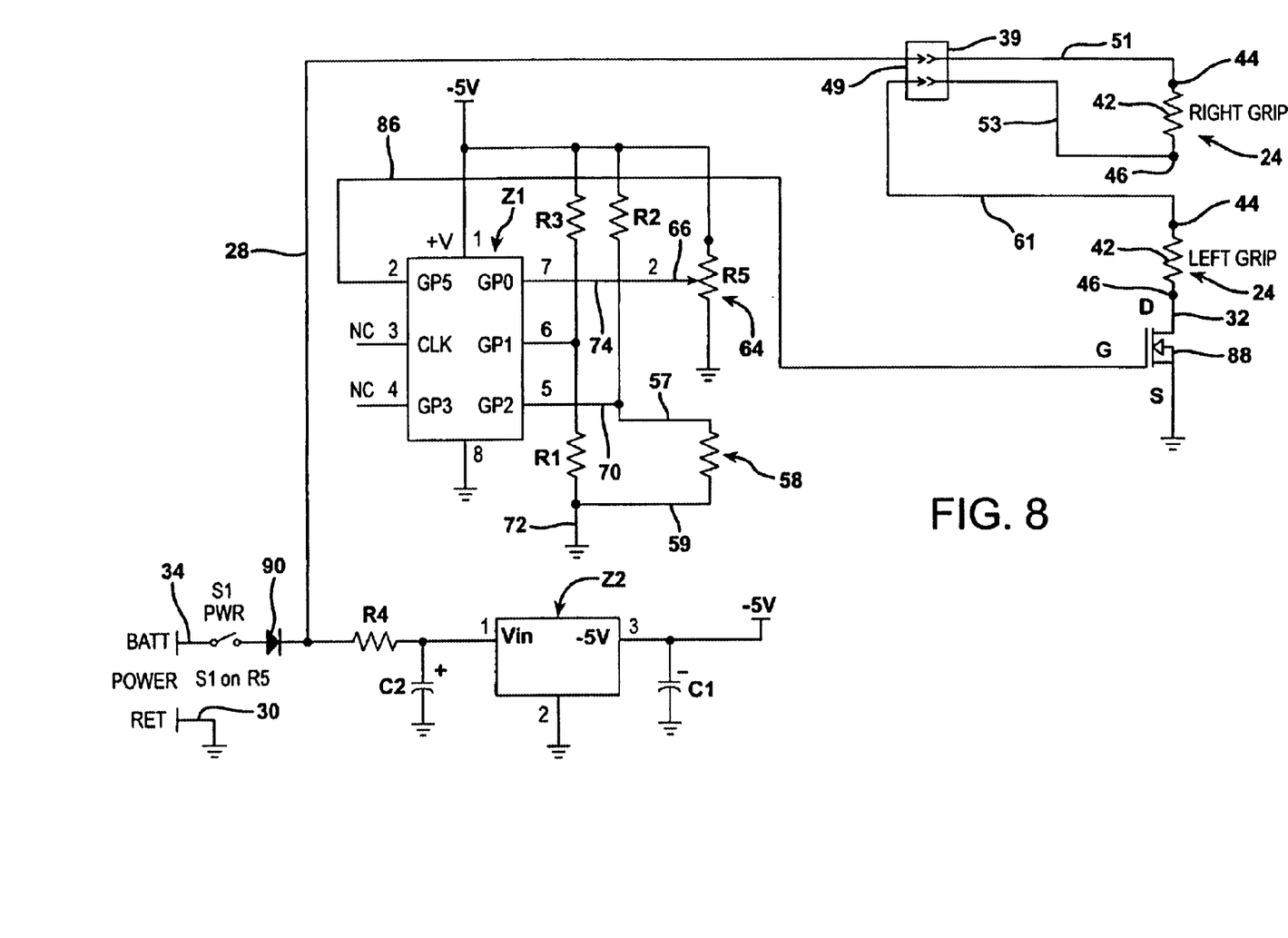
FIG. 8 is an electrical schematic diagram of the heated handgrips illustrated in FIG. 1.

Electrical heating element connector wires 61 and 32, shown in the schematic diagram of FIG. 8, are connected to the electrical resistence heating wire ends 44 and 46, respectively, of the left handgrip 18. Appropriate selection of the length and diameter of the heating wire 42 controls the wattage supplied. The length and diameter of the wire 42 is preferably selected to provide power at between about thirty and about forty watts.

Also, as shown in FIG. 3, a thermoplastic layer 48 of polypropylene is disposed about the sheathed heating wire 42. The layer 48 is formed by wrapping a length of polypropylene tape in spirally overlapping fashion on top of the sheathed electrical resistance heating wire 42 and the aluminum sheet 40 located therebeneath.

An outer semiresilient rubber or thermoplastic rubber sleeve 50 is provided for each of the handgrips 18 and 20. The sleeve 50 is disposed coaxially about the thermoplastic polypropylene layer 48, as illustrated in FIGS. 5 and 6. The polypropylene tape forming the thermoplastic layer 48 is coated with a pressure-sensitive adhesive on its radially inwardly facing surface so that it is adhesively bonded to the aluminum foil 40 and the Teflon sheath 43 on the heating wire 42. The sleeve 50 is injection molded onto the underlying structure. The particular composition of thermoplastic rubber forming the sleeve 50 is chosen so that it will thermally bond to the thermoplastic layer 48 when the sleeve 50 is injection molded in molten form onto the underlying structure illustrated in FIG. 3. Near its open, inboard end the sleeve 50 is necked down slightly where it is circumferentially surrounded by a chrome-plated metal band 52.

By utilizing the thermoplastic layer 48 on top of the aluminum foil 40 and the sheathed wire 42, a layered structure is transformed into a unitary article of manufacture that will not separate during use. Unlike conventional vehicle handgrips, there is no tendency for separation of the nylon inner handgrip sleeve 36 from the outer, thermoplastic rubber sleeve 50 due to the presence of the thermoplastic layer 48.

The tubular structure formed by the inner sleeve 36 and the outer sleeve 50 with the thermally conductive sheet 40, the sheathed electrical resistance heating wire 42 and the polypropylene layer 48 sandwiched therebetween forms a handgrip casing 56. One end of the casing 56 defines an open mouth surrounded by the collar 38 of the inner sleeve 36. The opposite end of the casing 56 defines an annular casing butt at the radially inwardly directed annular lip 39 of the inner sleeve 36, which defines a central, axial opening therethrough. As illustrated in FIG. 5, the casing 56 is adapted for positioning externally on either the left handlebar 12 or the right handlebar 14.

In addition to the electrical resistance heating wire 42, the casing 56 also has a temperature sensor embedded therewithin. The temperature sensor is a thermistor 58 which may be a Thermometrics model 5820-97-MS thermistor manufactured by Thermometrics Inc., 808 U.S. Highway 1, Edison, N.J. 08817-4695. The thermistor 58 is located in the longitudinal channel 41 of the inner sleeve 36 about midway along the length of the casing 56. Both the thermistor 58 and the electrical resistance heating wire 42 are thereby embedded within the casing 56.

The hollow, cylindrical, electrically insulated, tubular plastic core 26 is about seven-eighths of an inch in outer diameter throughout its length and includes a radially outwardly projecting flange 60 at its outboard end. The outer diameter of the flange 60 is one inch. As illustrated in FIG. 5, the core 26 is adapted for mounting internally within the hollow handlebar 12 and within the casing 56. The flange 60 at the outboard end of the core 26 resides in abutment against the outboard, annular edge of the open end of the handlebar 12. The flange 60 of the core 26 is thereby longitudinally trapped between the open end of the handlebar 12 and the annular flange 39 at the butt end of the casing 56.

The thermistor connecting wires 57 and 59 emanating from the thermistor 58 lie in the channel 41 of the inner sleeve 36. The thermistor connecting wires 57 and 59 and the connecting leads 61 and 32 from the electrical resistance heating element 24 of the left-hand grip 18 extend longitudinally outboard toward the butt end of the casing 56 and are then bent one hundred eighty degrees inwardly over the outboard end of the inner sleeve 36 and are then routed in an inboard direction back down the central, axial opening in the hollow core 26 where they are connected to terminals on the printed circuit board 62.

The twelve-volt power leads 34 and 30 from the motorcycle battery 16 are housed within a hollow cable sheath 29 and enter the casing 56 through the slot 63 in the collar 38. The power lead 34 is connected to the positive battery terminal while the power lead 30 is connected to the negative battery terminal. The power leads extend into the channel 41 from the location outboard from the collar 38 at which the cable sheath 29 ends. The power leads 34 and 30 emerge from the cable sheath 29 and lie in the channel 41 and extend further in an outboard direction longitudinally along the length of the inner sleeve 36. The power leads 34 and 30 are also bent one hundred eighty degrees at the open, outboard end of the inner sleeve 36 and are directed longitudinally through the open center of the core 26 to terminations on the printed circuit board 62.

The electrical resistance heating control circuit 22 located in the left handgrip 18 controls power to both its own electrical resistance heating element 24 and also the electrical resistance heating element 24 of the right handgrip 20. The right handgrip 20 therefore does not require a core 26 or a printed circuit board 62.

Figure 7:
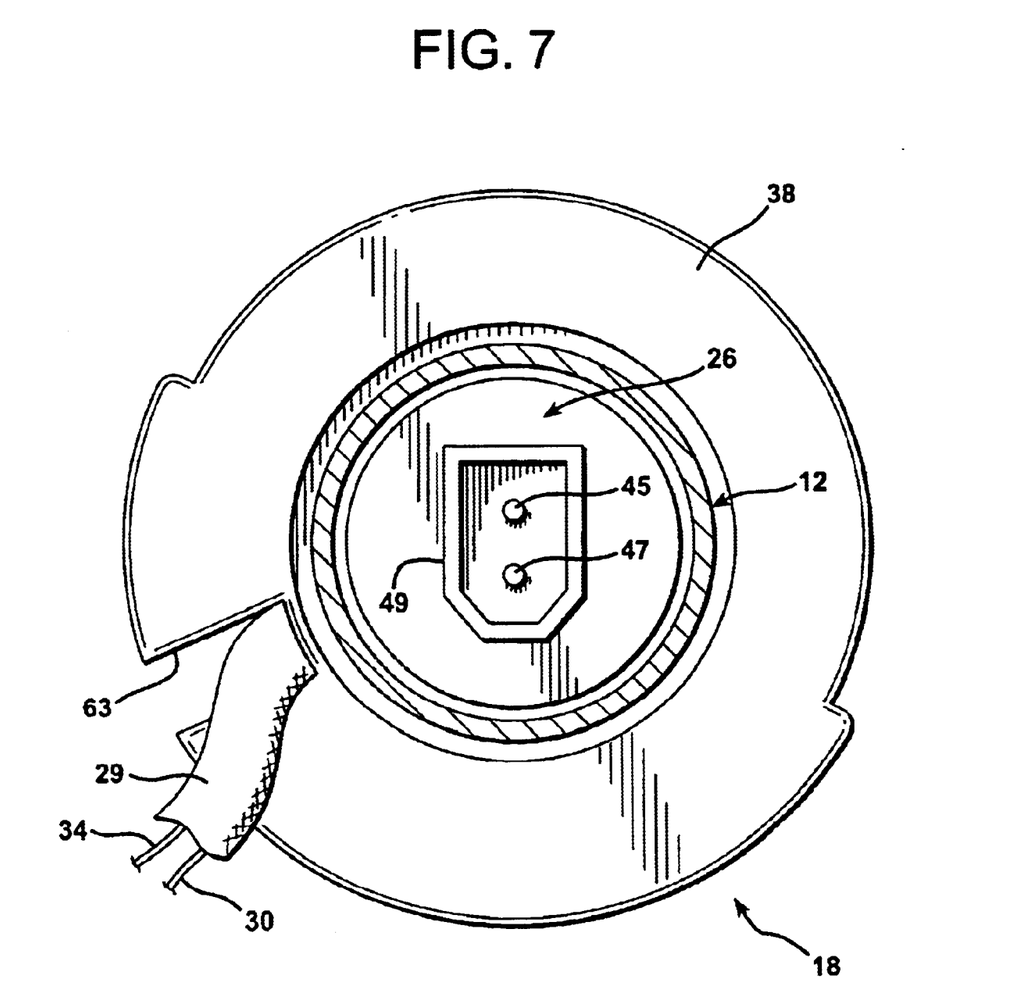
FIG. 7 is a transverse sectional view taken along the lines 7—7 in FIG. 5.

As indicated in FIGS. 5 and 7 and the schematic diagram of FIG. 8, twelve-volt power is supplied to the electrical resistance heating element 24 of the right handgrip 20 from line 28 and the return ground connection 53 from the right handgrip heating element 24 is coupled to the positive side of the heating element 24 in the left handgrip 18 by line 61. Lines 28 and 61 are physically located within the hollow core 26 in the left handgrip 18 and terminate at pins 45 and 47, respectively, in a unidirectional male coupling plug 49 that emanates from the inboard end of the hollow core 26, as illustrated in FIGS. 5 and 7. A sheathed extension cable 55 carrying extension wires 51 and 53 terminates in connections 35 and 37 in a plastic female socket 39 coupled to the plug 49. The sheathed extension cable 55 is routed from the plug 49 and socket 39 through the handle bars 12 and 14 and down the hollow center of the right handgrip 20. The wires 51 and 53 are respectively connected to the ends 44 and 46 of the electrical resistance heating wire 42 at the outboard end of the casing 50 of the right heated handgrip 20. The opposite ends of the wires 51 and 53 are respectively connected to female socket connections 35 and 37 in the socket 39 and are respectively releaseably engaged with pins 45 and 47 in the male plug 49.

The electrical resistance heating control circuit 22 in the left heated handgrip 18 is mounted on a narrow, relatively long printed circuit board 62. The printed circuit board 62 may, for example, be about two and seven-eighths inches in length, three-eighths of an inch in width, and one-sixteenth of an inch in thickness. The printed circuit board 62 is located within the hollow core 26, as illustrated in FIGS. 2 and 5. The control circuit 22 includes a programmed microprocessor Z1.

The electrical resistance heating control circuit 22 is further comprised of an adjustable, variable potentiometer 64 that includes a wiper 66, schematically indicated in the schematic diagram of drawing FIG. 8. The variable potentiometer has a disc-shaped body, as illustrated in FIGS. 2 and 5, from which a wiper adjusting post 68 projects in an outboard direction. The wiper adjusting post 68 is physically connected to the wiper 66 and is rotatable relative to the body of the variable potentiometer 64 about the longitudinal axis of the handgrip 18 so as to vary the position of the wiper 66 relative to the resistor R5 indicated in FIG. 8. The variable potentiometer 64 is mounted to the printed circuit board 62 by means of three wires 70, 72, and 74.

As illustrated in FIG. 5, the variable potentiometer 64 is positioned within the tubular core 26 so that the wiper adjusting post 68 projects longitudinally beyond the core flange 60 in an outboard direction at the axial center of the handlebar 12. A generally disc-shaped dial 76 is mounted on the grip casing 56. The dial 76 is mounted in the outboard butt end of the casing 56. The dial 76 has an axial socket defined in its inboard face to receive the wiper adjusting post 68 in tight fitting frictional engagement therewith. The dial 76 includes an inboard hub 80 that projects into the circular orifice defined by the flange 39 of the inner sleeve 36. The dial 76 is rotatable relative to the casing 56 and the handlebar 12 about the handlebar axis and rotates the wiper adjusting post 68 of the variable potentiometer 64 to the position selected by the user. The dial 76 thereby functions as a wiper control that is rotatably mounted to the grip casing 56 for the potentiometer wiper 66. The dial 76 is manipulatable externally of the handlebar 12 to operate the wiper 66.

Figure 4:
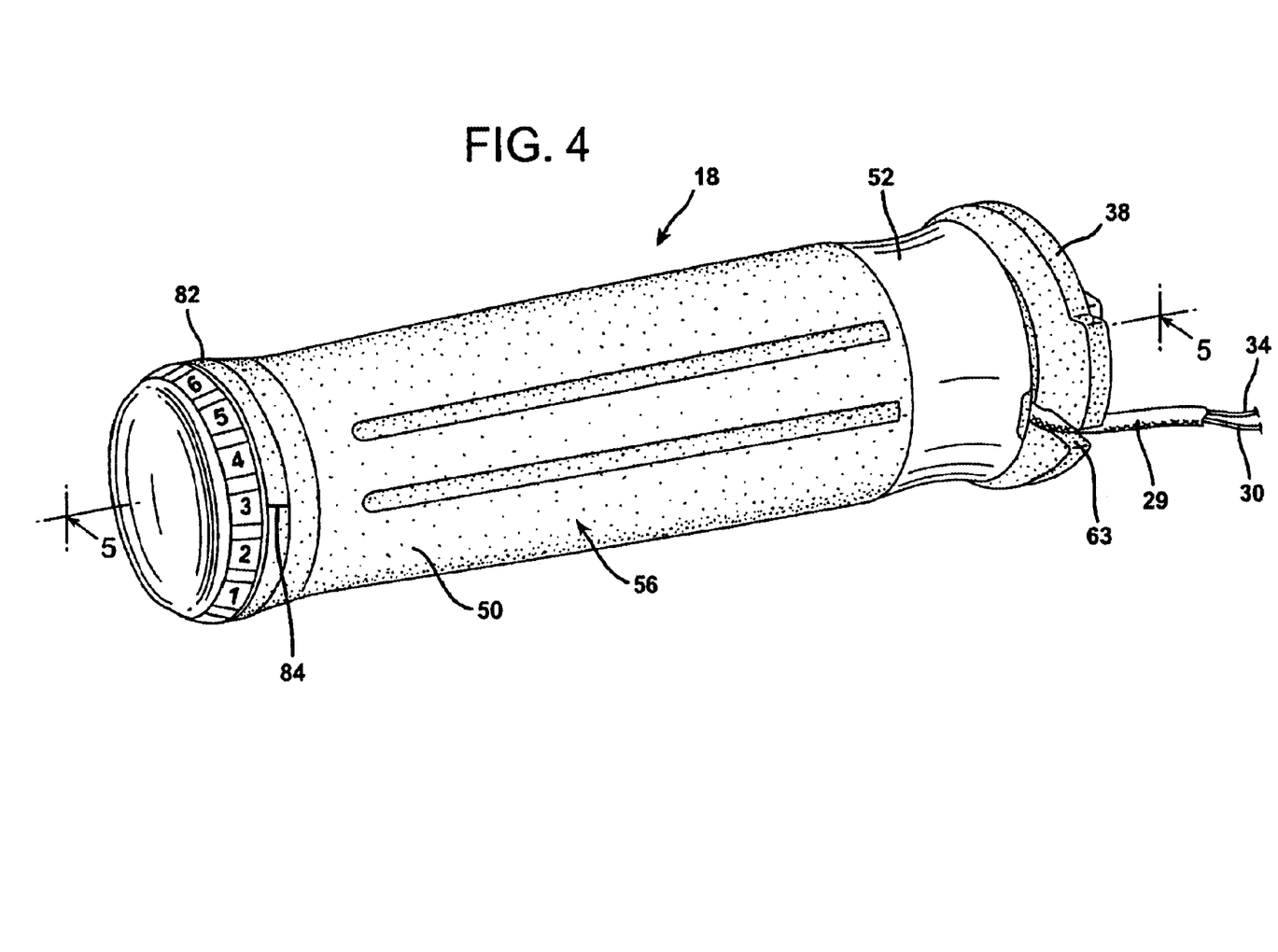
FIG. 4 is a perspective view showing the assembled left handlebar grip of FIG. 2.

Numerical indicia may be provided on the dial 76, as illustrated in FIG. 4. The casing 56 may be provided with an annular, chrome-plated, metal reference position ring 82 securely attached to the outer sleeve 50. The reference position ring 82 may be provided with a reference indicia 84 so that the user may select a desired temperature by rotating the dial 76 to a selected indicia position. Rotation of the dial 76, which rotates the wiper adjusting post 68, varies the position of the wiper 66 on the resistance R5 illustrated in the schematic diagram of FIG. 8. The dial 76 also operates a power switch S1 which is physically positioned within the housing of the variable potentiometer 64 and which is shown in the schematic diagram of FIG. 8. The dial 76 thereby manipulates the wiper 66 of the variable potentiometer 64 and also turns the power switch S1 off and on.

The microprocessor Z1 is preferably a model P1C 12C671 microprocessor manufactured by Microchip Inc. The microprocessor Z1 is programmed to contain a lookup table that correlates temperature dependent, resistance feedback signals from the thermistor 58 with a corresponding temperature in the lookup table. The microprocessor Z1 compares the corresponding temperature with a target temperature, which is established by the input on pin 7 of the microprocessor Z1 from the wiper 66 of the variable potentiometer 64. The microprocessor Z1 alternatively provides power or interrupts power to the heating elements 24 of both the left heated handgrip 18 and the right heated handgrip 20 by a driving output signal at pin 2 on line 86. This driving output is coupled to the base of a transistor 88, which serves as a switch to alternatively open or close the ground connections of the heating elements 24 in both of the handgrips 18 and 30.

As illustrated in the schematic diagram of FIG. 8, the heating elements 24 of both the left handgrip 18 and the right handgrip 20 are connected in series so that both heating elements 24 are controlled by the same switch, which is the transistor 88. The transistor 88 may be a model IRL3102 HexFet transistor manufactured by International Rectifier Inc.

The microprocessor Z1 provides a driving current on line 86 to the base of the switching transistor 88 so as to power the heating elements 24 of both of the grips 18 and 20 when the target temperature established by the variable potentiometer 64 exceeds the corresponding actual temperature as indicated by the thermistor 58. Alternatively, no driving current is supplied to the base of transistor 88 on line 86 when the target temperature established by the position of the wiper 66 in the variable potentiometer 64 does not exceed the corresponding actual temperature indicated by the thermistor 58. The microprocessor Z1 is also programmed to periodically sample the resistance on thermistor 58.

Preferably, the variable potentiometer 64 is calibrated with the microprocessor Z1 to vary the temperature of the electrical resistance heating elements 24 of the grips 18 and 20 between a minimum temperature of about ninety-five degrees Fahrenheit and a maximum temperature of about one hundred eighty degrees Fahrenheit. The minimum temperature is normally achieved by rotating the dial 76 to position the reference No. "1" on the dial 76 at the reference mark 84 on the casing 56. Rotation of the dial 76 to the position below the reference No. "1" operates the switch S1 and interrupts the power connection on power line 34, thereby turning heating power off to both handgrips 18 and 20. The maximum temperature is typically achieved by rotating the dial 76 to position the reference No. "6" on the dial 76 at the reference mark 84 on the casing 56. Of course, the actual temperature of the grips 18 and 20 will vary somewhat depending upon ambient atmospheric temperature and also wind chill, which is a function of the speed of the motorcycle 10, as well as wind speed and direction.

The microprocessor Z1 is programmed with a maximum shutoff temperature that is the highest target temperature that may be designated by manipulation of the wiper 66 of the variable potentiometer 64. For example, this maximum shutoff temperature may be one hundred eighty degrees Fahrenheit. If the actual temperature as indicated by the resistance of the thermistor 58 reaches this maximum, the microprocessor Z1 will not send a driving signal to the transistor 88 on line 86 irrespective of the relationship between actual feedback temperature indicated by the thermistor 58 and the target temperature established using the dial 76. The microprocessor Z1 thereby interrupts electrical power to the series connected heating elements 24 in both of the grips 18 and 20 when the corresponding actual temperature indicated by the thermistor 58 reaches the maximum shutoff temperature programmed into the microprocessor Z1. That is, the microprocessor Z1 interrupts power to the electrical resistance heating elements 24 whenever the feedback signals from thermistor 58 indicate a temperature that exceeds a predetermined maximum allowable temperature.

The control circuit 22 is also provided with a protective diode 90 where the electrical power leads 34 and 30 are coupled to the printed circuit board 62. The protective diode 90 safeguards the control circuit 22 from damage in the event that the electrical power leads 30 and 34 are connected in reverse, or are otherwise improperly coupled to the control circuit 22.

The control circuit 22 also includes a voltage regulator 96 that reduces the onboard 12-volt electrical storage battery voltage down to a positive five-volt supply for the microprocessor Z1, the thermistor 58, and the variable potentiometer 64. The voltage regulator 96 may be a model 78L05 5V regulator manufactured by STMicroelectronics Inc.

The inactive resistive and capacitive components of the electrical circuitry indicated in the schematic diagram of FIG. 8 are as follows:

TABLE 1

| Reference Number | Description |
| --- | --- |
| R1 | 2K Resistor |
| R2 | 5.1K Resistor |
| R3 | 1K Resistor |
| R4 | 820 ohm Resistor |
| R5 | 10 Kpot |
| C1 | 10 mf/50 V Capacitor |
| C2 | 10 mf/50 V Capacitor |

The unique construction of the casing 56 with the electrical resistance heating element 24 embedded therein provides a much more uniform distribution of heat and prevents damage to the heated handgrips 18 and 20 even if they are inadvertently left on in extremely hot weather. For example, if a rider through inattention or neglect leaves the dial 76 in a position supplying electrical current to the heating elements 24 when the motorcycle 10 is parked, the handgrips 18 and 20 will not be damaged. Even if the dial 76 is left in the maximum position at an extremely hot ambient temperature, for example one hundred ten degrees Fahrenheit, the heated grips 18 and 20 will not be damaged because the actual temperature will not exceed the maximum programmed temperature of one hundred eighty degrees Fahrenheit.

Even in the highly unlikely event that the microprocessor Z1 should fail in an ON condition with driving current continuously supplied on line 86, damage will not occur. The handgrips 18 and 20 of the invention have been tested by leaving electrical current on to them at thirty watts in each heating element 24 without a maximum temperature cut off in one hundred ten degrees Fahrenheit ambient temperature for more than ten hours. While the actual temperature of the heating elements 24 rises to between about two hundred fifty degrees and two hundred sixty degrees Fahrenheit, the use of the aluminum foil sheet 40 and the polypropylene sheathing 43 encasing the electrical resistance heating wire 42 prevents damage to either the inner sleeve 36 or the outer sleeve 50 of the casing 56.

Also, the circuit connections employed in the control circuit 22 ensure that power to the heating elements 24 is terminated if any of the connecting wires are broken or if any open circuit or short-circuit condition exists. Unlike conventional heated handgrips, there is no danger of damage to the operating electrical components, that is the microprocessor Z1, the transistor 88, the thermistor 58 and the voltage regulator 96. As a consequence, once any electrical faults that may occur are discovered and the connections repaired, the handgrips 18 and 20 will function normally again.

Undoubtedly, numerous variations and modifications of the invention will become readily apparent to those familiar with electrical resistance heating devices. For example, the same electrical circuitry employed in the heated cycle grips illustrated may also be employed in steering wheel covers, vehicle seats, gloves, boots, and jackets. Accordingly, the scope of the invention should not be construed as limited to the specific embodiment depicted and described, but rather is defined in the claims appended hereto.

What is claimed is:

1. In a vehicle handgrip employing an electrical resistance heating element embedded in a casing disposed coaxially about the open end of a hollow handlebar of a vehicle that includes an electrical storage battery, the improvement comprising a temperature sensor separate from said electrical resistance heating element and also embedded in said casing, a programmed electrical heating control circuit having electrical leads to said heating element and adjusted to monitor temperature within said casing as determined by said temperature sensor to maintain said heating element at a selected target temperature, a power input to said control circuit for operation from said vehicle battery and an adjustable potentiometer coupled to said control circuit and having a wiper controlled by a dial mounted on said casing wherein said dial is located in said open end of said hollow handlebar.

2. A handgrip according to claim 1 wherein said temperature sensor provides feedback signals and said control circuit includes a microprocessor which receives said feedback signals and which is programmed to contain a lookup table to correlate said feedback signals with temperatures and to conduct and interrupt electrical power to said electrical resistance heating element according to whether said temperatures meet or exceed said target temperature.

3. A handgrip according to claim 2 wherein said microprocessor is further programmed to interrupt power to said electrical resistance heating element whenever said feedback signals indicate temperatures that exceed a predetermined maximum temperature.

4. In a vehicle handgrip employing an electrical resistance heating element embedded in a casing disposed coaxially about the open end of a hollow handlebar of a vehicle that includes an electrical storage battery, the improvement comprising a programmed electrical heating control circuit having electrical leads to said heating element and adjusted to maintain said heating element at a selected target temperature and a power input to said control circuit for operation from said vehicle battery, and a handgrip core located within said hollow handlebar and said programmed electrical heating control circuit is located within said handgrip core.

5. A handgrip according to claim 4 wherein said handgrip core is a hollow, tubular structure and said programmed electrical heating control circuit is mounted on a printed circuit board which is located within said hollow handgrip core.

6. A heated vehicle handgrip for mounting on an open end of a hollow handlebar comprising:
a tubular grip casing, one end of which defines an open mouth and an opposite end of which defines an annular casing butt with a central axial opening therethrough, wherein said casing is adapted for positioning externally on said handlebar and has an electrical resistance heating element and a temperature sensor embedded therewithin,
an electrical resistance heating control circuit,
electrical heating element connectors extending from said electrical resistance heating element at said casing butt to said control circuit,
electrical temperature sensor connectors extending from said temperature sensor at said casing butt to said control circuit,
electrical power leads coupled to said electrical resistance heating control circuit to provide power thereto and to said electrical heating element, and
a hollow, electrically insulated core adapted for mounting internally within said hollow handlebar and within said casing and including inboard and outboard ends and a radially outwardly projecting flange at its outboard end, whereby said flange is longitudinally trapped between said open end of said handlebar and said annular casing butt, and said electrical resistance heating control circuit is located within said hollow core.

7. A heated vehicle handgrip according to claim 6 further characterized in that said electrical resistance heating control circuit is mounted on a printed circuit board that is located within said hollow core, and further comprising an adjustably variable potentiometer secured relative to said casing and including a wiper, and a dial mounted on said grip casing and movable in rotation relative thereto to manipulate said wiper of said potentiometer.

8. A heated vehicle handgrip according to claim 7 wherein said dial is mounted in said butt of said casing.

9. A heated vehicle handgrip for mounting on an open end of a hollow handlebar comprising:
a tubular grip casing, one end of which defines an open mouth and an opposite end of which defines an annular casing butt with a central axial opening therethrough, wherein said casing is adapted for positioning externally on said handlebar and has an electrical resistance heating element and a thermistor embedded therewithin,
an electrical resistance heating control circuit,
electrical heating element connectors extending from said electrical resistance heating element at said casing butt to said control circuit,
electrical temperature sensor connectors extending from said temperature sensor at said casing butt to said control circuit,
electrical power leads coupled to said electrical resistance heating control circuit to provide power thereto and to said electrical heating element circuit, and wherein said control circuit includes a microprocessor that is programmed to contain a lookup table and said microprocessor is further programmed to periodically ascertain electrical resistance in said thermistor through said electrical temperature sensor connectors, correlate electrical resistance from said thermistor with a corresponding temperature in said lookup table, compare said corresponding temperature with said selected target temperature, and provide power to said electrical heating element when said selected target temperature exceeds said corresponding temperature and interrupt electrical power to said electrical heating element when said selected target temperature fails to exceed said corresponding temperature, and
a variable potentiometer having a wiper that controls said selected target temperature and a wiper control rotatably mounted to said grip casing and manipulatable externally of said handlebar to operate said wiper.

10. A heated vehicle handgrip according to claim 9 wherein said microprocessor is programmed with a maximum temperature, and said microprocessor interrupts electrical power to said electrical heating element when said corresponding temperature reaches said maximum temperature.

11. A heated vehicle handgrip according to claim 9 wherein said control circuit includes a protective diode where said electrical power leads are coupled thereto to safeguard said control circuit from damage in the event said electrical power leads are improperly coupled to said control circuit.

12. A heated vehicle handgrip for mounting on an open end of a hollow vehicle handlebar comprising:

an inner handgrip sleeve formed of an electrical insulating material for mounting coaxially upon said hollow vehicle handlebar end, a sheet of thermally conductive metal foil wrapped about said inner handgrip sleeve, a sheathed electrically conductive heating wire having opposing ends and overwound about said metal foil sheet, a dielectric sheath encasing said heating wire, wherein said dielectric sheath is resistant to thermal degradation up to a temperature greater than four hundred fifty degrees Fahrenheit, a thermistor positioned proximate said sheathed heating wire, a heating control circuit coupled to said thermistor, and an outer sleeve disposed coaxially about said sheathed heating wire and said thermistor.

13. A heated vehicle handgrip according to claim 12 further comprising a thermoplastic layer disposed about said sheathed electrical resistance heating wire and adhesively secured to said metal foil and thermally bonded to said outer sleeve.

14. A heated vehicle handgrip according to claim 13 wherein said metal foil sheet is aluminum foil.

15. A heated vehicle handgrip according to claim 13 wherein said dielectric sheath is formed of a polytetrafluoroethylene coating.

16. A heated vehicle handgrip according to claim 13 wherein said thermoplastic layer is polypropylene and said outer sleeve is comprised of a thermoplastic rubber.

* * * * *